United States Patent
Yach et al.

(10) Patent No.: US 6,341,288 B1
(45) Date of Patent: Jan. 22, 2002

(54) DATABASE SYSTEM WITH METHODOLOGY FOR ACCESSING A DATABASE FROM PORTABLE DEVICES

(75) Inventors: David P. Yach; James D. Graham; Anthony F. Scian, all of Waterloo (CA)

(73) Assignee: Sybase, Inc., Emeryville, CA (US)

( * ) Notice: Subject to any disclaimer, the term of this patent is extended or adjusted under 35 U.S.C. 154(b) by 0 days.

(21) Appl. No.: 09/124,532

(22) Filed: Jul. 29, 1998

(51) Int. Cl.$^7$ .............................................. G06F 17/30
(52) U.S. Cl. ................... 707/103 R; 707/100; 707/101; 707/102
(58) Field of Search .............................. 707/1, 2, 3–4, 707/10, 100–101, 102, 103, 205, 104; 717/1, 3, 5; 713/200

(56) References Cited

U.S. PATENT DOCUMENTS

| | | | |
|---|---|---|---|
| 4,799,254 A | | 1/1989 | Dayton et al. ............ 379/93.26 |
| 5,291,399 A | | 3/1994 | Chaco ............................ 705/3 |
| 5,664,228 A | | 9/1997 | Mital .......................... 710/62 |
| 5,668,987 A | * | 9/1997 | Schneider ...................... 707/3 |
| 5,671,404 A | | 9/1997 | Lizee et al. ..................... 707/5 |
| 5,694,601 A | * | 12/1997 | White ........................ 709/101 |
| 5,819,066 A | * | 10/1998 | Bromberg et al. .......... 707/102 |
| 5,822,750 A | * | 10/1998 | Jou et al. ....................... 707/2 |
| 5,826,077 A | * | 10/1998 | Blakeley et al. ................ 707/4 |
| 5,950,190 A | * | 9/1999 | Yeager et al. ................... 707/3 |

OTHER PUBLICATIONS

Parallelizing loops in database programming languages by Daniel F. Lieuwen, Bell Lab, Lucent Technology, (IEEE paper) p. 86–93 (1998).*

* cited by examiner

*Primary Examiner*—Diane D. Mizrahi
(74) *Attorney, Agent, or Firm*—John A. Smart

(57) ABSTRACT

An "UltraLite" database development environment capable of creating a database application that is more portable across multiple devices, including ones having limited computational power, is described. The applications themselves can incorporate SQL statements and SQL cursors for use against data sources, including UltraLite databases. The UltraLite development environment generates code to process the SQL in the application. The application code and generated code are compiled and then linked with the UltraLite runtime library. The result is an UltraLite program that includes application logic and database logic together in a single program. The environment includes, at its core, an "Analyzer" which receives SQL from the pre-compiler and submits the SQL to an available database server (e.g., Sybase Adaptive Server Anywhere) for parsing and optimization. The Analyzer uses the database server's (i.e., the database server of Adaptive Server Anywhere) access plans and schema information to generate C code to execute the SQL statements. By making the footprint for an UltraLite program as small as possible, the system provides a database system with low overhead, making it easier to create an application targeting device having limited computational power.

25 Claims, 11 Drawing Sheets

DATABASE SYSTEM WITH METHODOLOGY FOR ACCESSING A DATABASE FROM PORTABLE DEVICES

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

COMPUTER PROGRAM LISTING APPENDIX

A Computer Program Listing Appendix, containing five (5) total files on compact disc, is included with this application.

BACKGROUND OF THE INVENTION

The present invention relates generally to information processing environments and, more particularly, to access and processing of information in a data processing system embodied, at least in part, in portable devices.

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level.

The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server), to form a client/server database system. In operation, clients issue one or more query language (e.g., SQL) commands to the server. A query language is a specialized language for accessing and processing information from a database. SQL commands may, for instance, specify a query for retrieving particular data (i.e., data records meeting the query condition) from a database table. The syntax of SQL (Structured Query Language) is well documented; see, e.g., the abovementioned *An Introduction to Database Systems*. As used herein, "SQL" shall also include vendor-specific variants of SQL, such as Sybase® Transact-SQL. In addition to retrieving the data from database server tables, the clients also include the ability to insert new rows of data records into the table; clients can also modify and/or delete existing records in the table. Commercial examples of these "client/server" systems include Powersoft™ clients connected to one or more Sybase Adaptive Server™ database servers. Both Powersoft™ and Sybase Adaptive Server™ (formerly Sybase SQL Server™) are available from Sybase, Inc. of Emeryville, Calif.

As the migration to client/server continues, each day more and more businesses are run from mission-critical systems which store information on SQL-based database systems. At the same time, there is much interest in decreasing the physical requirements of such systems, so that such systems can provide decision support not only from servers but also from portable, hand-held devices. Currently, however, database application development on small footprint devices or "ultralight" devices involves hand coding any database functionality and host database synchronization. At the same time, users expect the productivity and reliability advantages of using a SQL database, while maintaining the size and performance advantages of hand-coded applications.

What is needed is a database development environment enabling the creation and deployment of database applications which are more portable across multiple devices, including ones having limited computational power. At the same time, however, such database applications would include the productivity and reliability advantages of a SQL database. The present invention fulfills this and other needs.

SUMMARY OF THE INVENTION

A database development environment (referred to herein as the "UltraLite" database development system or environment) capable of creating a database application that is more portable across multiple devices, including ones having limited computational power, is described. UltraLite includes development tools and methodology that allow the development of database applications for these devices. The applications themselves can incorporate SQL statements (i.e., standard query language statements) and SQL cursors for use against data sources, including UltraLite databases (i.e., databases created by the UltraLite system). UltraLite includes the ability to synchronize data in an UltraLite program (i.e., program created by the UltraLite system) with data in a host SQL database.

The UltraLite development environment generates code to process the SQL in the application. The application code and generated code are compiled and then linked with the UltraLite runtime library. The result is an UltraLite program that includes application logic and database logic together in a single program. Multiple applications that share the same database are linked as a single UltraLite program. The footprint for an UltraLite program is minimized, to be generally less than 100K. This includes support for synchronization, but excludes memory requirements for the actual data in the database. The footprint of the database logic in the program will depend mostly on the amount of SQL and the features used (e.g., data types, operators, and SQL built-in functions). Fixed overhead is minimized; in the currently-preferred embodiment, for instance, there is no separate database engine.

UltraLite databases are preferably implemented as data structures within an UltraLite program. An UltraLite database preferably only exists in memory. Persistence of an UltraLite database is accomplished by using one of two common methods for handheld devices: using persistent memory (static memory or flash memory) or having the UltraLite program run forever.

UltraLite applications, which may be authored in the UltraLite environment, are typically written in the C programming language and use static embedded SQL to specify SQL statements and cursors within applications. An UltraLite Pre-compiler is employed to process embedded SQL (or other query language statements) in source files (e.g., C files) and generate new source files (e.g., still C files) without the embedded SQL. The environment includes, at its core, an "Analyzer" which receives SQL from the Pre-compiler and submits the SQL to an available database server (e.g., Sybase Adaptive Server Anywhere) for parsing and optimization. The Analyzer uses the database server's (i.e., the database server of Adaptive Server Anywhere) access plans and schema information to generate C code to execute the SQL statements.

In the currently-preferred embodiment, an UltraLite application does not employ dynamic SQL. An UltraLite database has no system tables, no SQL parser, and no optimizer. The SQL statements, cursors, and access plans are instead determined when the code for the program is generated. Host variables in static embedded SQL allow values in the application logic to be incorporated into SQL queries, but they do not allow changes to table or column names in the currently-preferred embodiment. For example, the same data sorted two different ways will require two SQL cursors with different ORDER BY clauses.

The target platforms for UltraLite include standard development platforms, such as Windows NT, to allow application developers to develop and test the database logic in their application without needing to download the UltraLite program to the real target device. This is especially important when the debugging features available on the real target device are crude. Some target devices may also provide an emulator for the device on the UltraLite development environment, allowing the application developer to develop, test, and debug the entire application (including user interface) in a single environment.

Specific method steps of the overall process of development of an UltraLite database application are as follows. First, the user creates in a source code editor one or more source code files for the database application program under development; the source code includes SQL statements. The Pre-compiler of the system parses the source code files and provides the parsed information to the Analyzer. The Analyzer passes the SQL statements to the RDBMS for formulating the data access, including an access plan, optimizations, and database cursors. Moreover, the Analyzer creates appropriate data structures and methods in the application program for a creating, accessing, and processing a run-time version of the database. Based on the foregoing, the system creates new source code files which include native source code statements replacing the abovementioned SQL statements. Now, the source code is ready for compilation. Specifically, the source code files are compiled by the Compiler into one or more object modules. The Linker links the object modules with the runtime libraries and emits a compiled application program. The application program includes both application logic and database logic for accessing a target database embedded within the program.

DETAILED DESCRIPTION OF A PREFERRED EMBODIMENT

The following description will focus on the presently-preferred embodiment of the present invention, which is operative in an environment executing database applications, typically on portable devices requiring SQL database support. The present invention, however, is not limited to any particular application or environment, or query language (e.g., SQL) syntax. Instead, those skilled in the art will find that the present invention may be advantageously applied to any application or environment where embedding a database system, particularly SQL ones, is desirable. The description of the exemplary embodiments which follows is, therefore, for the purpose of illustration and not limitation.

General Architecture

A. System Hardware

Figure 1:
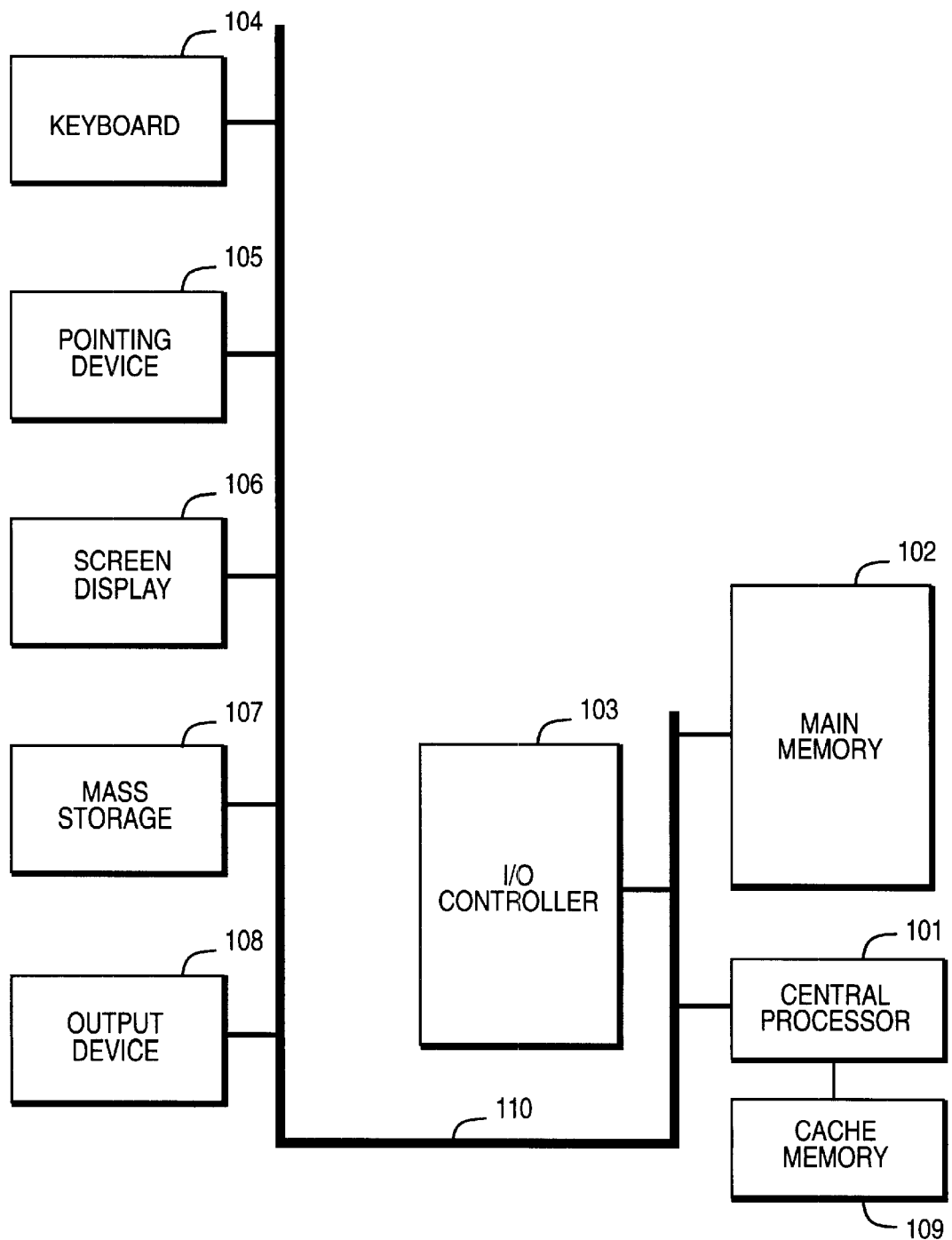
FIG. 1 is a block diagram of a computer system in which the present invention may be embodied.

The present invention may be embodied on a computer system such as the system 100 of FIG. 1, which includes a central processor 101, a main memory 102, an input/output controller 103, a keyboard 104, a pointing device 105 (e.g., mouse, track ball, pen device, or the like), a display device 106, a mass storage 107 (e.g., removable disk, floppy disk, fixed disk, optical disk (including CD-ROM), and the like), and a cache memory 109. Additional input/output devices, such as a printing device 108, may be provided with the system 100 as desired. As shown, the various components of the system 100 communicate through a system bus 110 or similar architecture. In a preferred embodiment, the system 100 includes an IBM-compatible personal computer, available from a variety of vendors (including IBM of Armonk, N.Y.).

Database applications, once created using the system, will typically be deployed on portable computing devices. Examples of such devices include Palmpilot™ available from 3Com of Santa Clara, Calif., HP Palmtop PCs available from Hewlett-Packard of Palo Alto, Calif., and StarTac™ cell phones available from Motorola of Schaumburg, Ill.

B. System Software

Figure 2A:
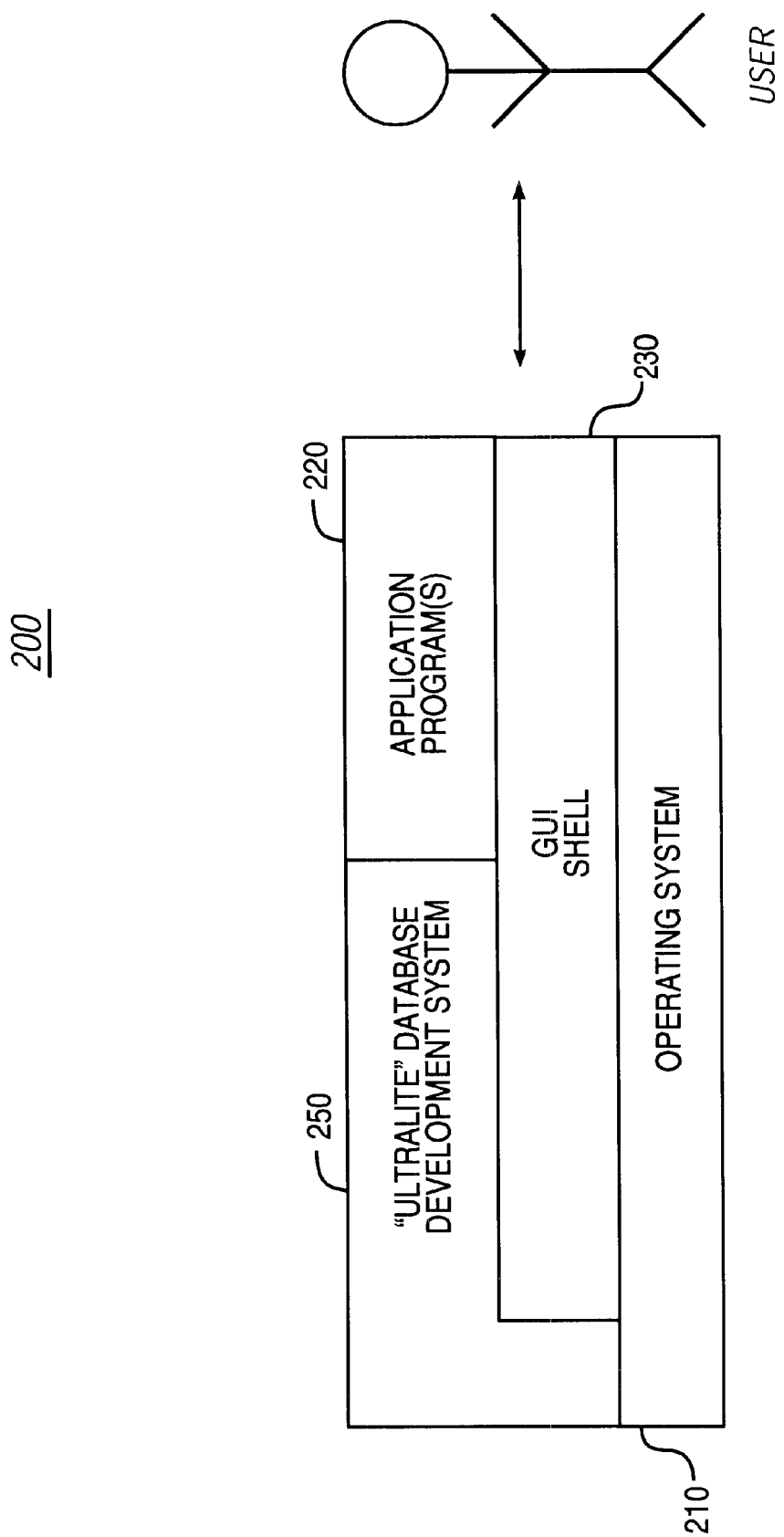
FIG. 2A is a block diagram of a software system for controlling the operation of the computer system of FIG. 1, the software system including a development system of the present invention.

Illustrated in FIG. 2A, a computer software system 200 is provided for directing the operation of the computer system 100. Software system 200, which is stored in system memory 102 and/or on disk storage 107, includes a kernel or operating system (OS) 210 and a graphical user interface (GUI) shell or interface 230. One or more application programs, such as application programs 220, may be "loaded" (i.e., transferred from storage 107 into memory 102) for execution by the system 100. OS 210 and shell 230, as well as application software 220, include an interface for receiving user commands and data and displaying results and other useful information. Software system 200 also includes a development system 250 of the present invention for developing system and application programs. As shown, the development system 250 includes components which interface with the system 100 through shell 230 as well as components which interface directly through OS 210.

In a preferred embodiment, operating system 210 and windows shell 230 are provided by Microsoft® Windows 95/Windows NT, available from Microsoft Corporation of Redmond, Wash. Those skilled in the art will appreciate that the system may be implemented in other platforms, including Macintosh, UNIX, and the like. Development system 250, on the other hand, includes a database development environment, of the present invention. Application software 220 can be any one of a variety of software applications, such as word processing, database, spreadsheet, text editors, and the like, including those created by the development system 250.

The following description will focus on those aspects of the development system that are helpful for understanding the methodology of the present invention for accessing and processing databases from portable devices.

Designing and Deploying an "Ultralight" Database

A. General

The present invention provides an "ultralight" database development environment (referred to herein as "UltraLite") designed for deploying database solutions in extremely small footprint devices like cell phones, pagers, personal organizers, or the like. Such devices (i.e., "UltraLite" target devices) typically have many common characteristics, including:

1) They have no hard disk.

2) They have relatively little memory (e.g., 256K is considered small, while 4 Mb is considered large).

3) They usually have device specific operating systems with limited functionality and small footprint.

4) Applications always stay running. The device may have a power conservation mode, but the device is typically never turned off.

5) A development environment will often exist to allow C programs to be written for the device (e.g., Microsoft Windows® CE SDK), including some form of debugging tools.

6) The device supports some form of communication with other computing platforms (e.g., a communication socket supporting TCP/IP). Examples of such devices include (but are not limited to) Windows® CE and PalmPilot™ devices, for instance. The UltraLite system thus provides development tools and methodology that allow the development of database applications for these devices. The applications themselves can incorporate SQL statements (i.e., the well-known SQL or Structured Query Language) and SQL cursors for use against data sources, including UltraLite databases (described below). As described in further detail below, UltraLite includes the ability to synchronize data in an UltraLite program with data in a host SQL database.

The UltraLite development environment generates code to process the SQL in the application. The application code and generated code are compiled and then linked with the UltraLite runtime library. The result is an UltraLite program that includes application logic and database logic together in a single program. Multiple applications that share the same database are linked as a single UltraLite program The footprint for an UltraLite program is minimized, to generally be less than 100K. This includes support for synchronization, but excludes memory requirements for the actual data in the database. The footprint of the database logic in the program will depend mostly on the amount of SQL and the features used (e.g., data types, operators, and SQL built-in functions). Fixed overhead is minimized; in the currently-preferred embodiment, for instance, there is no separate database engine.

UltraLite databases are preferably implemented as data structures within an UltraLite program. An UltraLite database preferably only exists in memory. Persistence of an UltraLite database is accomplished by using one of two common methods for handheld devices: using persistent memory (static memory or flash memory) or having the UltraLite program run forever.

B. Components of the UltraLite development system

Figure 2B:
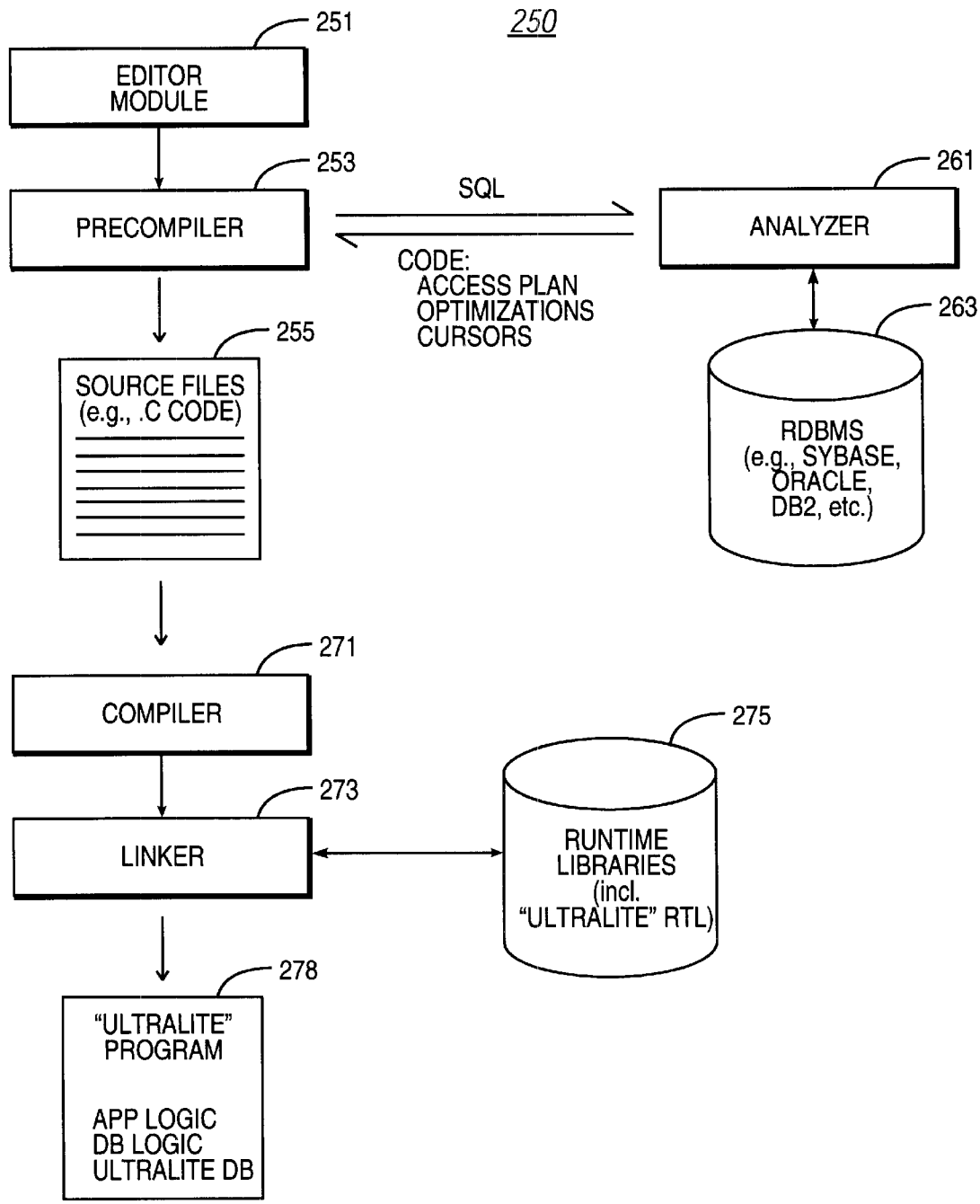
FIG. 2B is a block diagram showing the development system of the present invention in further detail.

Shown in further detail in FIG. 2B, a development system 250 of the present invention includes an Editor 251, a Pre-compiler 253, an Analyzer 261 (in communication with a relational database management system or RDBMS 263), a Compiler 271, a Linker 273, and Runtime Libraries 275, for creating executable "UltraLite" programs. In particular, the user creates source code programs using Editor 251. Here, UltraLite applications, which may be authored in the UltraLite environment, are typically written in C and use static embedded SQL to specify SQL statements and cursors within applications. In turn, the UltraLite Pre-compiler 253 is employed to process embedded SQL source files and generate source files 255 (e.g., in the C programming language).

As shown, the "Analyzer" 261 receives SQL from the Pre-compiler and submits the SQL to an available RDBMS/database server 263 (e.g., Sybase® Adaptive Server Anywhere™) for parsing and optimization. Generally at the RDBMS, a query which has been received is parsed by the RDBMS's Parser and then passed to the RDBMS's Optimizer. The Optimizer formulates a strategy which is communicated to the RDBMS's Compiler and Execution Unit as the "query plan"—that is, the data access plan or strategy. At query execution time, the RDBMS's Access Methods are invoked for performing low-level access, as required by the query plan. Further description of formulation of a query plan by a RDBMS may be found, for instance, in commonly-owned application Ser. No. 08/808,604, filed Feb. 28, 1997 now U.S. Pat. No. 5,822,749, the disclosure of which is hereby incorporated by reference. By using the built-in ability of a database server (e.g., Sybase Adaptive Server Anywhere™) to create access plans and schema information, the Analyzer 261 leverages off existing data systems for generating C code to implement the logic required for the SQL statements.

In the currently-preferred embodiment, an UltraLite application does not employ dynamic SQL. An UltraLite database has no system tables, no SQL parser, and no optimizer. The SQL statements, cursors, and access plans are instead determined when the code for the program is generated. Host variables in static embedded SQL allow values in the application logic to be incorporated into SQL queries, but they do not allow changes to table or column names in the currently-preferred embodiment. For example, the same data sorted two different ways will require two SQL cursors with different ORDER BY clauses.

After the source code files 255 (including header/include files) have been emitted by the Pre-compiler 253, the program may be generated in a conventional manner. In particular, from the source code files 120 and header/include files, the Compiler 271 "compiles" or generates object module(s). In turn, the Linker 273 "links" or combines the object modules with the Runtime Libraries 275 to generate the compiled program(s) 278, which may be executed by a target processor (e.g., processor of an UltraLite device). The Runtime Libraries 275 themselves comprise functions (e.g., written in C) which provide runtime support, including, for instance, memory management, input/output support, type checking, and the like, as well as including specific UltraLite runtime support.

The target platforms for UltraLite include standard development platforms, such as Windows NT, to allow application developers to develop and test the database logic in their application without needing to download the UltraLite program to the real target device. This is especially important when the debugging features available on the real target device are crude. Some target devices may also provide an emulator for the device on the UltraLite development environment, allowing the application developer to develop, test, and debug the entire application, including the user interface, in a single environment.

Internal Data Structures and Design

A. Design considerations

The UltraLite system includes internal data structures that are designed for an in-memory database that will run on devices with limited memory. This leads to the following design considerations and assumptions:

1. Keeping the data structures small is an important design criterion.

2. Reading rows randomly from the database should incur no performance penalty beyond accessing memory.

3. Updating rows randomly in the database has the same performance characteristics as writing the same amount of data sequentially.

4. Memory allocation failures will be the norm, rather than the exception. The UltraLite system handles all memory allocation failures by failing the current operation. The data structures can be separated into persistent data structures and non-persistent data structures. On devices that support persistent memory (e.g., static or flash memory), the persistent UltraLite data structures will still exist when the database is not running. The non-persistent data structures are built each time the database is started.

B. Database definition

The root of the entire non-persistent data structure is a global variable, database definition, that defines the database. This global variable is generated by the UltraLite Analyzer. The database definition has pointers to three arrays:

1. An array of pointers to table definition structures (shown in FIG. 3 below).

2. An array of pointers to option settings.

3. An array of connection structures.

All three arrays are fixed length and statically initialized. The database definition also has a linked list of open cursors. When a cursor is opened, its cursor structure is added to this linked list. When it is closed, it is removed.

C. Table definitions

Figure 3:
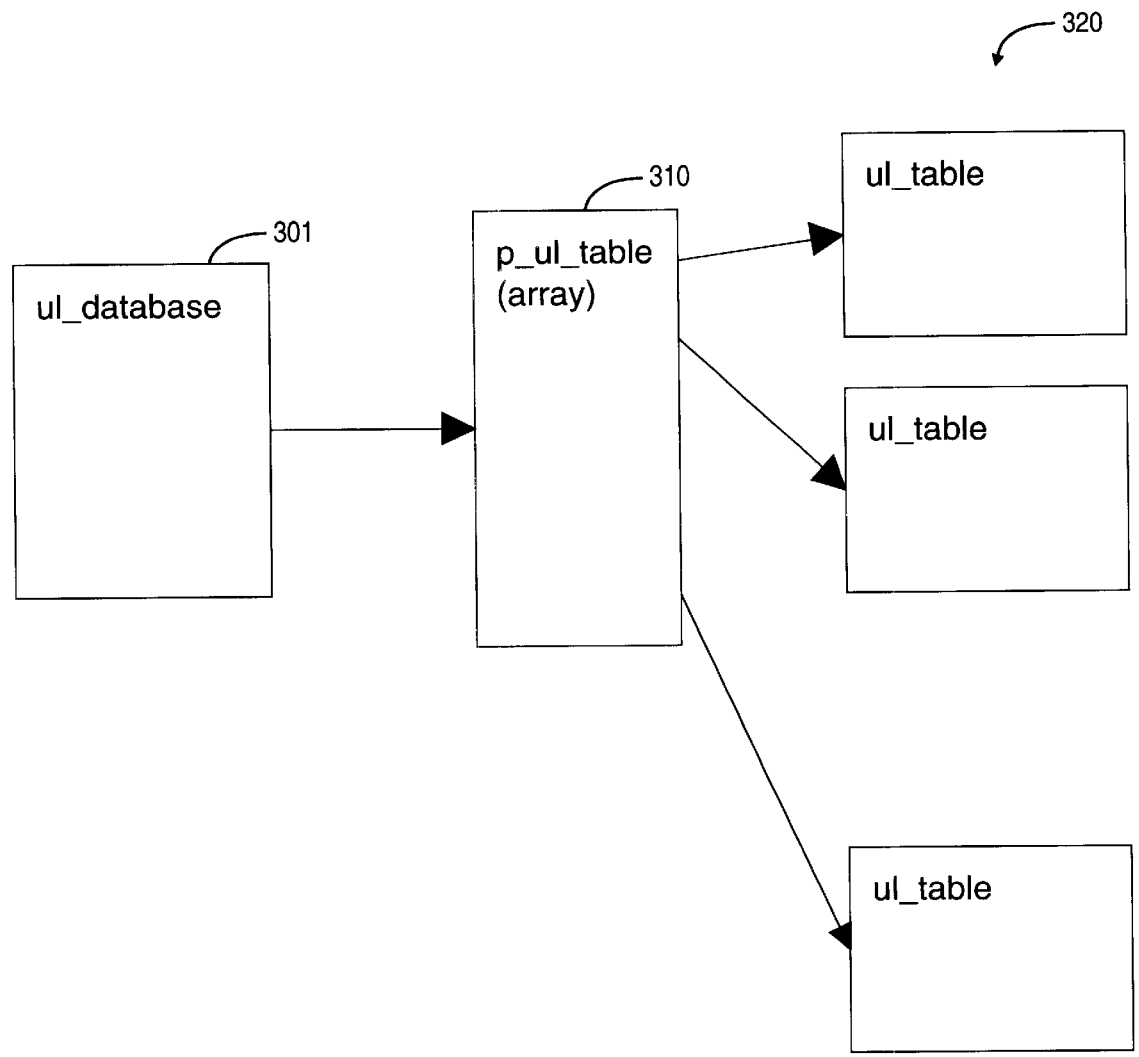
FIG. 3 is a block diagram illustrating the relation between a database and its tables.

FIG. 3 is a block diagram illustrating the relation between a database (represented by database data structure 301) and its tables. As shown, each table in the database has a table definition, represented by table definition data structures 320. The table definition is a structure that is generated and initialized by the Analyzer. All table definitions are referenced in the database definition's array of table definitions, shown at 310. There is one table definition for each base table in the database. There is also one table definition for each temporary table (i.e., materialized result set). The table definition is the root of the non-persistent data structure for a single table in the database.

D. Table maps

Figure 4:
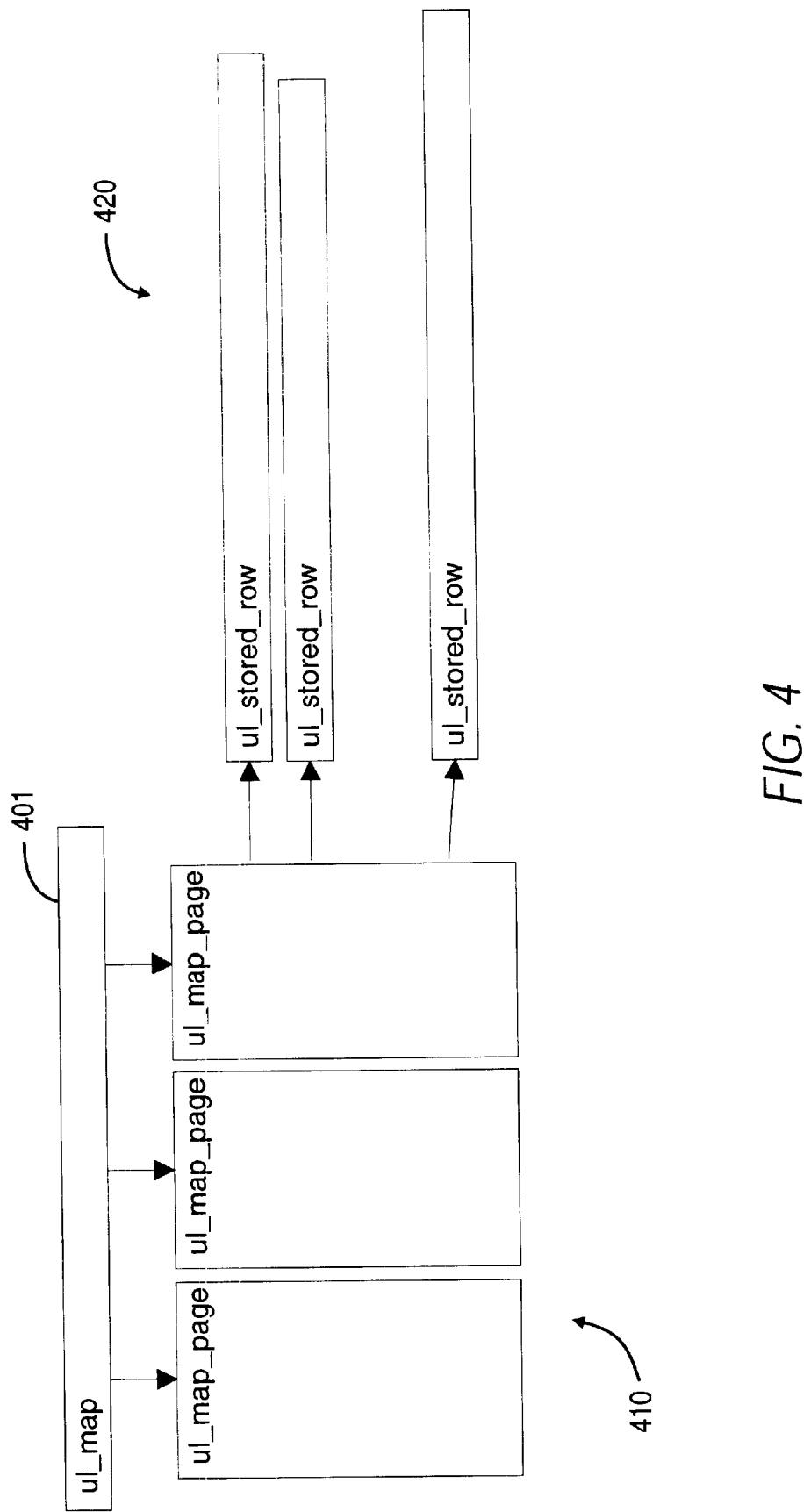
FIG. 4 is a block diagram illustrating a table map data structure employed by the present invention.

The rows in the database are persistent. Each row in the database has a row handle. A row handle is a device-specific handle (e.g., four bytes) that provides access to the row. The only persistent data structure in an UltraLite database is a table map 401, illustrated in FIG. 4, that provides access to the rows. Each table in the database has a table map. The table map is typically implemented as an array of row handles 420. Because the array can be large, the array is broken into pieces by the table map and each piece of the array is called a "page," as illustrated at 410.

Table map pages are typically implemented as fixed size (e.g., 256 handles). When a new page is added to the table map, the page is initialized with null row handles. When a row is added to a table, it uses the first element of the table map with a null row handle. When a row is removed from a table, the table map element is set to the null row handle.

The index of a table map element serves as an identifier for a row within a given table. By limiting tables to, for example, 65535 rows, a row id comprising a two-byte value can be employed to uniquely identify a row in a table. All parts of the UltraLite database outside the table map module refer to rows by row id. Having a two-byte (or other relatively small) row id keeps data structures as small as possible, which is especially important in the index data structure.

Table maps are typically never compressed or re-ordered. The row id of a row is implemented such that it does not change while the database is running, as row ids are kept in several data structures. Also, the order of rows in an index depends on using row ids to break ties when two rows compare equal. Currently, row ids are not stored anywhere when the database is not running. If desired, row ids can be stored within rows as an alternative to keeping values for foreign key columns.

E. Rows

Rows can be stored rows or retrieved rows. The generated code for executing SQL statements works with retrieved rows. These retrieved rows are temporary copies of rows. All rows in the database are kept as stored rows.

Each table definition has function pointers for two generated functions that copy between stored rows and retrieved rows. The store function copies a retrieved row into a stored row. The retrieve function copies a stored row into a retrieved row. A retrieved row is a fixed length structure for each table. A stored row is compressed to reduce the amount of memory used to store the row.

All rows (stored or retrieved) have the first byte reserved to hold the current state of the row. One bit indicates the row has been inserted. A second bit indicates the row has been deleted. An updated row will show up as two rows; one is flagged as deleted and the other is flagged as inserted. Four bits are used to indicate the connection that performed the operation on the row. The connection bits are only set when the row has not been committed. The connection bits will be cleared when a connection commits the current transaction.

An UltraLite database supports multiple (e.g., 15) connections concurrently. Each connection can have one transaction. The row state bits are used for the following purposes:

commit and rollback synchronization with the host database preventing connections from seeing uncommitted rows preventing connections from seeing deleted rows recovery (rolling back uncommitted transactions after going down dirty)

The format of a retrieved row is determined by a structure definition that is generated by the Analyzer for each table. Immediately following the state byte are bytes that contain bit flags to indicate null values in the row. Beyond that, a fixed-length field is employed to hold the value of each column in the table.

The format of a stored row is similar. It is a variable length array of bytes determined by the functions that store and retrieve rows for the table. Immediately following the state byte, there are bytes that contain bit flags to indicate null values in the row. There are also bits that are used when compressing column values. Beyond the bit flag bytes, the row contains compressed values for each non-null column in the row.

F. Index definitions

An important sub-structure of a table definition is the array of pointers to index definitions. Each index (primary key, foreign key, or non-key index) has an index definition. The index definition is generated and initialized by the Analyzer. An index id is employed to represent the position of the index definition in the table definition's array of pointers to index definitions.

Figure 5:
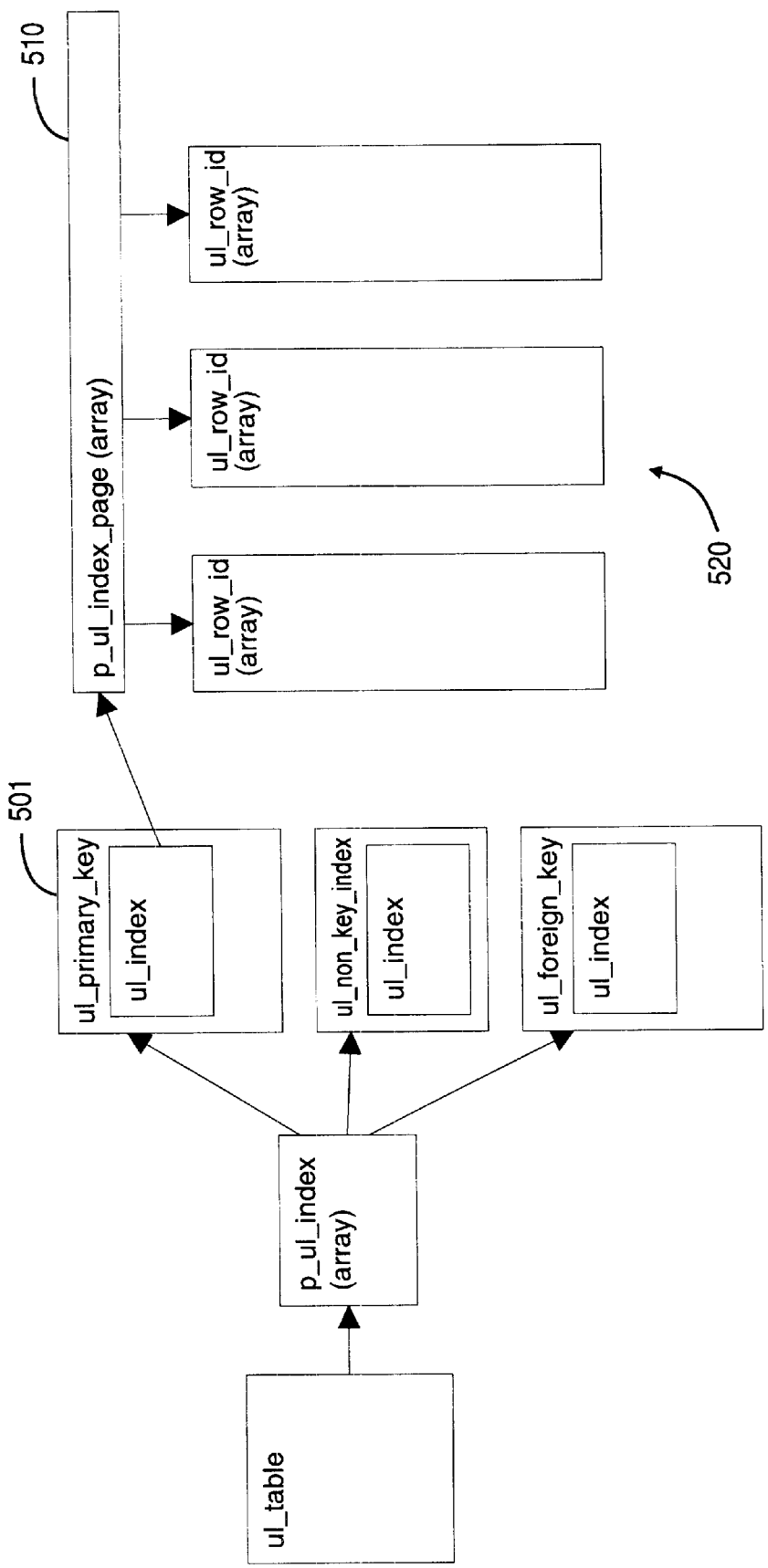
FIG. 5 is a block diagram illustrating an index data structure employed by the present invention, which is used to maintain an ordering (logically) for all rows in a table.

The purpose of each index is to maintain an ordering (logically) for all rows in a table. This is accomplished by keeping an ordered list of row ids, as shown at 520 in FIG. 5. Because the list can be long, it is broken into pieces and each piece of the list is called an index "page," as show at 510. The index root, shown at 501 for the table's primary key index, is an array of handles to index pages. UltraLite indexes are preferably not arbitrary depth trees. They only have one root page and as many leaf pages as are needed. By not using arbitrary depth indexes, the indexes and the code to maintain them are much smaller. A root page can hold up to, for instance, 256 leaf page handles. Each leaf page has a fixed size (e.g., 256 row ids).

Each index definition has a pointer to a generated function that will compare two retrieved rows from the table. The order of the row ids in the index is determined by calling this function. If two rows are equal (i.e., all indexed column values are the same), the relative order of the rows in the index is determined by comparing the row ids of the rows.

Each page in the index might be partially unused. The free space in an index page is kept at the end of the page; all row ids in an index page are contiguous at the beginning of the index page. The index pages are a non-persistent data structure and are built whenever the UltraLite database is started. Primary keys and foreign keys are indexes with additional features. A primary key (or uniqueness constraint) definition has a linked list of all foreign key definitions that refer to this primary key (or uniqueness constraint).

G. Cursors and table uses

Figure 6:
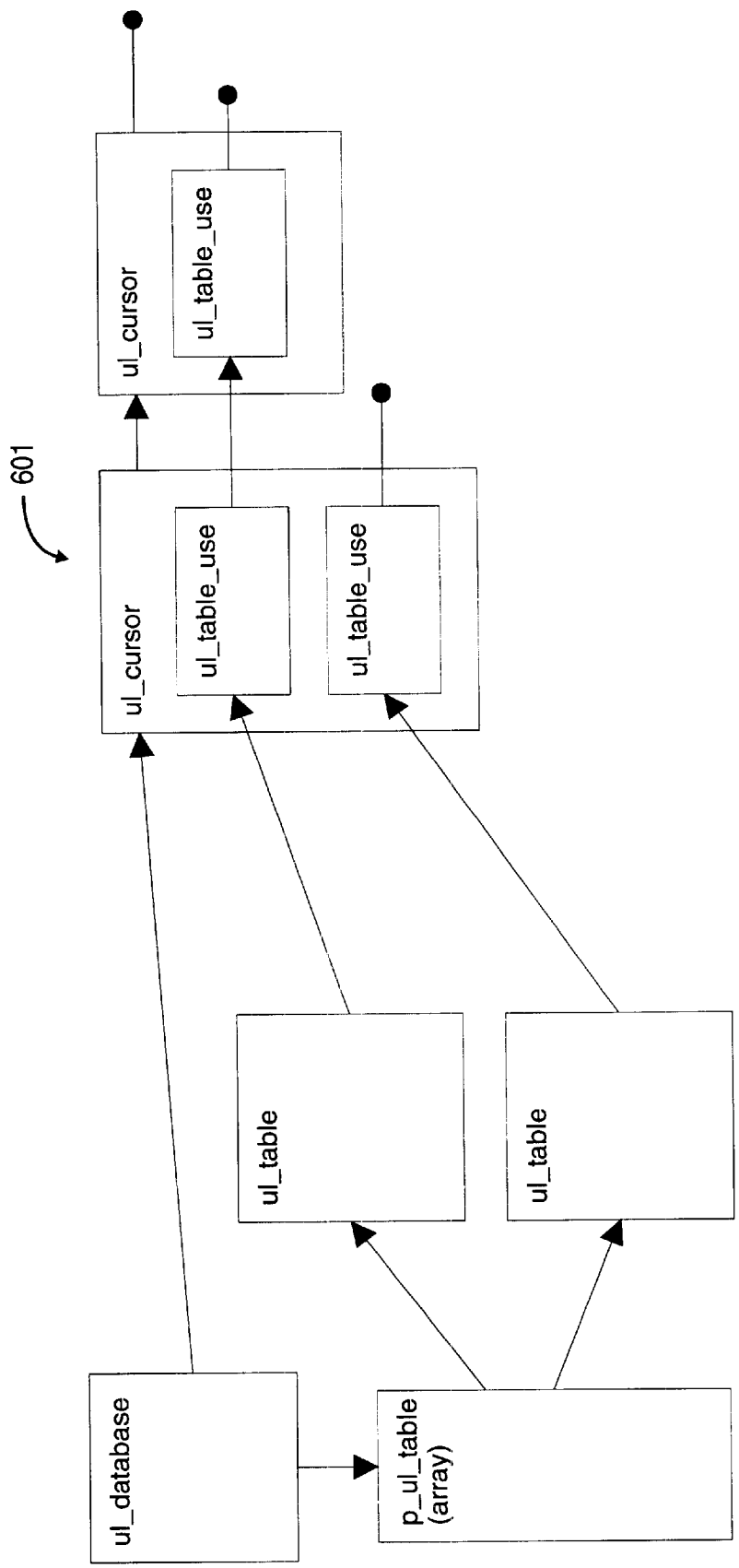
FIG. 6 is a block diagram illustrating a cursor data structure employed by the present invention, which stores state information for a SQL statement.

Each SQL statement should keep state information while it is executing or open. This state information is kept in a structure called a database cursor 601, illustrated in FIG. 6. When an application opens a cursor, the database allocates a corresponding database cursor to keep the state of the open cursor. When an application closes the cursor, the database frees the corresponding database cursor. The database will also allocate a database cursor for any executed SQL statement (insert, update, delete, select into) while the statement is running. While a database cursor is allocated, it is kept in the linked list of open cursors. The head of the linked list is in the database definition. The database cursor holds state information for a SQL statement while it is executing. A single SQL statement might have several queries. For example, a union of two SELECT statements has one query for each select in the union and another to perform the union. The queries each have separate automata in the generated code. The database cursor holds the current state of each query.

A single SQL statement might refer to several tables. It might even refer to the same table multiple times with different correlation names or in different subqueries. For each table use in a statement, there is a corresponding table use structure within the database cursor. Each table definition has the head of a linked list of open table uses for the table. When a cursor is opened, every table use in the cursor is added to the appropriate linked list.

When a table is used in an SQL statement, the rows are considered using the ordering provided by an index. Every table generally must have at least one index. A table use contains the table id of the table being scanned, the index id of the index being used, and the direction of the scan (forward or backward). The table use also has the current position of the scan and the retrieved row for the current position. The current position in the index is kept as a page number and element number. The page number determines which index page the current row is on. The element number determines which element within the page is the row id for the current row.

H. Connections and transactions

An UltraLite database supports multiple connections concurrently, with each connection having one transaction. The purpose of an UltraLite transaction data structure is to be able to commit or rollback operations that have been done by a given connection. The rollback might be a complete rollback of all operations since the beginning of the transaction. It might also be a rollback to an arbitrary point within the transaction. For example, when a statement executes that modifies more than one row (insert, update, or delete), it may encounter an error after modifying some rows successfully. In this case, the modifications made by the failed statement need to be undone.

The transaction data structure is employed which comprises an ordered list of rows that have been modified by a transaction. Each entry in the transaction is a table id and a row id. The table id and row id uniquely identify a row in the database. The bit flags in the row tell what operation was performed on the row. An insert entry in the transaction will refer to a row with the inserted bit on. A delete entry in the transaction will refer to a row with the deleted bit on. An updated row will have two entries in the transaction; the first entry will refer to the old version of the row and the second will refer to the new version of the row. All rows referred to by a transaction will have the connection bits in the row set to the connection id corresponding to the transaction.

All transaction entries are added to the end of the transaction. A successful commit will clear the connection bits in all affected rows and free the entire transaction. The commit will not clear the inserted and deleted bits because they are still needed for synchronization. A rollback will undo operations in the opposite order from how they occurred; inserted rows will be freed and deleted rows win have the deleted bit reset. The rollback will also clear the connection bits in the rows.

I. Concurrency and isolation

The UltraLite database system can support standard isolation levels (e.g., standard isolation levels 0 or 1). To prevent dirty reads, any connection that attempts to retrieve a row that has been modified by another connection will be blocked or given an error. This is determined by looking at the connection bits in the row. UltraLite can support cursor stability. Any connection that attempts to update or delete a row that is the current row of a cursor will be blocked or given an error. This is determined by going through the linked list of table uses for a given table.

J. Synchronization

1. General

Synchronization capabilities are provided to work with standard data sources, including Sybase® Adaptive Server Enterprise™, Sybase® Adaptive Server Anywhere™, Oracle®, and Microsoft® SQL Server. An UltraLite database has a subset of the tables in a host database. Each table includes a subset of the rows from the host database. Each table can also have a subset of the columns from the host database. The UltraLite database may have tables that are not synchronized with the host database, but all rows in a synchronized table of an UltraLite database will be synchronized to the host database.

Data in an UltraLite database might be fairly transient. For example, a field agent who visits customers requires information related to the customers. Memory requirements may limit the number of customers kept within the UltraLite database. Synchronization therefore needs to allow new data to be requested easily from a host database and old data to be removed easily from the UltraLite database.

The transient data in an UltraLite database is preferably user specified or centrally specified. For example, the list of customers to visit for a given day might be determined by the field agent. Instead, the list might be determined centrally and the field agent visits customers who show up in the UltraLite database. UltraLite synchronization will support either method. UltraLite synchronization preferably employs a direct connection with an UltraLite synchronization server. This connection might be over a wireless network or using a docking mechanism. The UltraLite synchronization server will perform synchronization of the UltraLite database with the host SQL database.

UltraLite synchronization is timestamp-based in the host SQL database, in contrast to, for instance, Sybase SQL Remote™ or Sybase Replication Server™ which both use operations from the transaction log of the database. Changes from an UltraLite database are submitted as a single transaction to the host SQL database. UltraLite synchronization requires logic in the host database to record the timestamp when an UltraLite database synchronizes with the host. Each time the UltraLite database synchronizes with the host, it only sends changes to the UltraLite database that occurred since the last synchronization. A single UltraLite database will be allowed to synchronize with multiple host SQL databases. This will allow a roaming UltraLite database to access the closest host database when performing synchronization. Replication between multiple host databases may be provided by available products, such as Sybase SQL Remote™ or Sybase Replication Server™.

Schema changes in the UltraLite database require an UltraLite program to be re-generated and re-compiled. New tables and columns can be added to a host database without affecting UltraLite databases. Most schema changes affecting columns in the host database that are also in the UltraLite database will require the UltraLite program and database to be re-built.

2. Internal operation

When an UltraLite database is synchronized with a host database, an upload stream is created containing operations in the UltraLite database that need to be applied to the host database. In a complimentary fashion, a download stream is created for containing operations from the host database that need to be applied to the UltraLite database.

The first part of the upload stream contains a description of the tables in the database:

stream format version number (byte)
    database id (unsigned long)
    number of tables (unsigned short)
    for each table
        length of table name (unsigned short)
        table name (# bytes in name)
        number of columns (unsigned short)
        for each column
            primary key, allow nulls, domain id for column (byte)

The remaining part of the upload stream contains rows that have been inserted, updated, or deleted:

for each table
        for each modified row (ordered by primary key)
            stored row
        zero byte to indicate end of rows for this table A stored row is the most compact representation of a row, which keeps the length of the synchronization stream as short as possible. The stored rows will all have the inserted bit or the deleted bit set. An updated row will be in the stream twice. The old values will be a "deleted" row and the new values will be an "inserted" row.

New data or changes made to existing data in the host database are downloaded to the UltraLite database. This process uses a stream of data that is the same as the upload stream, but does not have a database description at the beginning. The format of the rows in the download stream matches the description given in the upload stream.

Figure 7A:
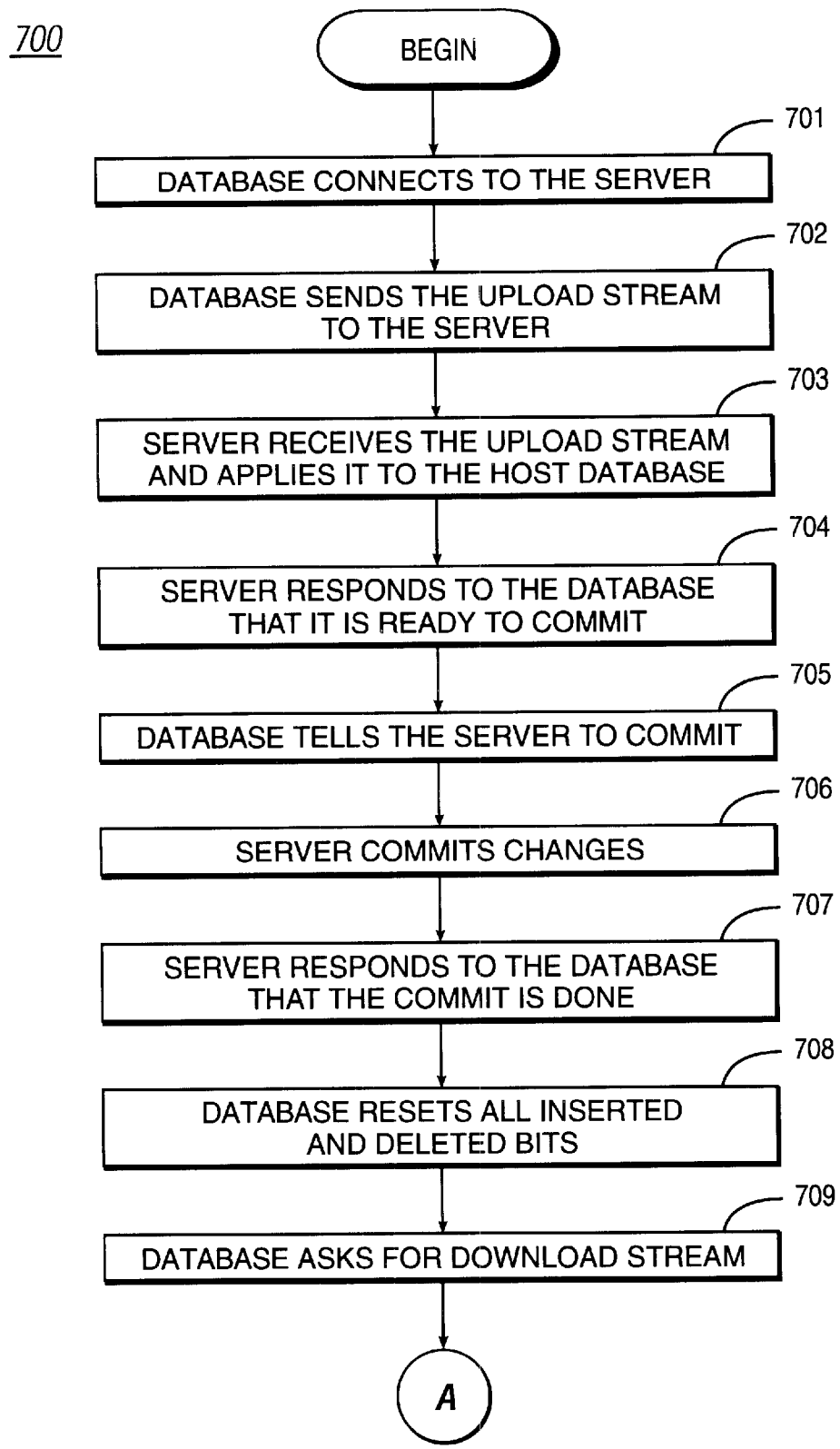
FIGS. 7A–B comprise a flow chart illustrating method steps of the present invention for synchronizing an UltraLite database with a host database.
Figure 7B:
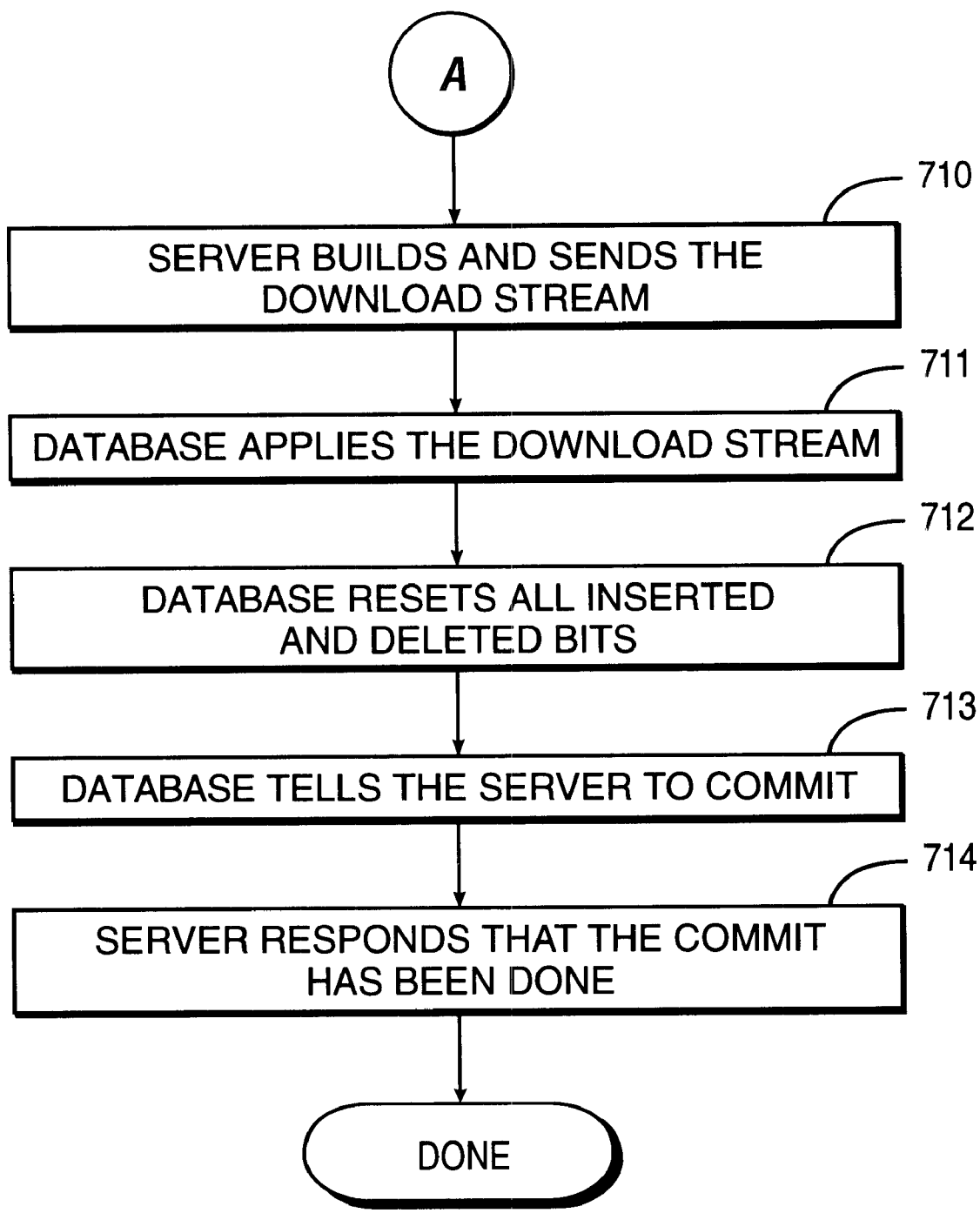

When an UltraLite database is synchronized with a host database, the following method steps 700 are performed in order by the UltraLite database and UltraLite server, as illustrated in FIGS. 7A–B. At step 701, the database connects to the server. The database sends the upload stream to the server, at step 702, and the server receives the upload stream and applies it to the host database, at step 703. The server responds to the database that it is ready to commit, as shown at step 704. The database tells the server to commit, at step 705. The server commits changes, at step 706, and the server responds to the database that the commit is done, at step 707. At step 708, the database resets all inserted and deleted bits. Now, at step 709, the database asks for the download stream. The server builds and sends the download stream, at step 710. The database applies the download stream, as shown at step 711. The database resets all inserted and deleted bits, at step 712, and tells the server to commit, at step 713. The server responds that the commit has been done, at step 714, whereupon the synchronization session concludes.

There is a window of time after the commit happens (step 706), but before the UltraLite database knows the commit has happened (step 707). If communication is terminated during this time, the changes have been made to the host database, but the inserted and deleted bits have not been reset in the UltraLite database. Therefore, a recovery mechanism is provided.

K. Recovery

Recovery is provided for platforms that support persistent memory. When an UltraLite database is terminated abnormally, it must be recoverable. The persistent data structures must always be in a state where they are valid. Moreover, the database must recover to a consistent point. All uncommitted transactions must be undone and all committed transactions must be kept. The database cannot contain the effects of a partial transaction.

Recovery is the primary reason for having only one simple persistent data structure. The table maps and the associated rows are the only persistent data structure. Whenever the table map or a row is modified, it must be done so that the data structure will be valid if the database is terminated at any point during the update of the data structure.

Recovery requires a database state byte to be kept in persistent memory. When the database is started, it looks at the database state byte to determine what state the database was in when it was terminated. Here are the possible states and the actions on recovery:

1. Being created: The database was terminated while it was still being created. The database must be freed, and created from scratch.
2. Shut down cleanly: The database was not terminated while it was running. No recovery is necessary. The startup logic must iterate over every row in the database to build all the indexes. There should be no uncommitted rows in the database.
3. Running normally: The database was running when it was terminated, but it was not in any special state. The startup logic must undo any uncommitted operations that are in the database. Any inserted rows with connection bits still set will be freed. Any deleted rows with connection bits still set will have the deleted bit reset.
4. Committing a connection/transaction (connection id is part of state byte): The database was terminated while a commit was resetting the connection bits in all rows affected by the transaction. The startup logic must commit any operations for the given connection, but undo operations for all other connections.
5. Uploading: The database was terminated after the upload stream was sent to the host and the host was asked to commit, but before the host responded. The startup logic does not know if the commit happened in the host database. The database cannot be allowed to be used while it is in this state. There is no way to distinguish between operations that happened before the interrupted upload and ones that happened after the interrupted upload. The host might be inaccessible due to bad phone lines or lack of wireless service. This is undesirable, because someone cannot be prevented from using their database because they cannot connect to the server. To solve the problem, another bit is introduced into each row. The "maybe uploaded" bit will be set in any row that might have been uploaded. The next time the system connects to the server, it determines if the "maybe uploaded" changes should be sent again or if the inserted bits should be reset and the deleted rows should be freed.
6. Downloading: The database was terminated while applying operations from the host. The startup logic must undo any downloaded operations. One does not need to worry about the case where communication is cut off between resetting the download bits and performing the commit at the host. The same information will be downloaded on the next download, but will not cause errors. All downloads are processed as updates when the row exists and inserts when it does not and downloads do not perform conflict resolution.
7. Reseting synchronization: The database was terminated during synchronization while the inserted bits were being reset and the deleted rows were being freed. This can happen after the database receives confirmation of the commit during upload or it can happen after all operations have been applied during a download. The startup logic must reset all inserted bits and free all deleted rows.

UltraLite Example

A. General

The following example, simplified for purposes of clarity, illustrates how SQL within an UltraLite application is specified and what type of code will be generated. UltraLite applications are written in C with static embedded SQL. The UltraLite Analyzer generates C code for executing any SQL contained in the application,(within the constraints of the SQL supported by UltraLite). The UltraLite pre-compiler converts embedded SQL to C code that calls functions generated by the UltraLite Analyzer.

The generated code in this example is simplified for purposes of clarity, to highlight the basic organization of the code. For example, this code shows a table as an array of pointers to rows. The data structure to access rows will typically not be as simple as an array of pointers.

B. Simple Table

This example uses one table called "Activity". Each row in the table corresponds to a single activity. The priority column indicates a priority for the activity and the description contains a text description of the activity. For simplicity of the example, the table has no primary key and no indexes.

```
CREATE TABLE Activity (
    activity_id     INTEGER NOT NULL,
    priority        INTEGER NOT NULL,
    description     CHAR(80) NOT NULL
)
```

C. Simple Query

The following is a portion of an UltraLite application that uses a query to fetch and display all activities with a priority of one.

```
EXEC SQL INCLUDE SQLCA
extern void DisplayHighPriority( void )
/**************************************/
// Display all high priority activities
{
    EXEC SQL BEGIN DECLARE SECTION
        char buffer[80];
    EXEC SQL END DECLARE SECTION
    EXEC SQL DECLARE HighPriority CURSOR FOR
    SELECT description FROM Activity AS act WHERE priority = 1;
    EXEC SQL OPEN HighPriority;
    for( ; ; ) {
        EXEC SQL FETCH HighPriority INTO :buffer;
        if( SQLCODE == SQLE_NOTFOUND ) break;
        printf( "%s\n", buffer );
    }
    EXEC SQL CLOSE HighPriority;
}
```

D. Generated Code for Tables

Each table used by an UltraLite application will have a single source code module (e.g., C module) generated for the table. All queries that use the given table will call entry points in this module. A header file will be generated for each table module that will contain declarations necessary to use the table module. Entry points in the table module will all use an argument that is a pointer to a structure that contains all of the state information for a single use of a table in a query. The system keeps a list of table uses for each table in the database.

Each table use will keep a copy of the current row or it might have pointers to values in the current row. This will depend on the format of the data in the rows within the table. The memory requirements of an UltraLite database will usually require that the rows within a table be compressed. Uncompressing the values from the current row into a less compact format in the table use will keep the generated code as small as possible. The trade-off is the time required to compress/uncompress the rows. If desired, UltraLite may support an option that favors speed or size, depending on the needs of the application. It is also possible that UltraLite will allow the application to have a pointer to the values in the table use rather than copying the values to host variables on a fetch.

Exemplary generated code for a table is as follows.

```
// header file declarations
// a single use of the Activity table in a query
typedef struct T_Activity {
    struct T_Activity *   next;            // linked list of table uses
    int                   current;         // current position in table
    int                   activity_id;     // value in current row
    int                   priority;        // value in current row
    char                  description[80]; // value in current row
} T_Activity;
// a single row in the Activity table
typedef struct R_Activity {
    int                   activity_id;
    int                   priority;
    char                  description[80];
} R_Activity;
extern void InitActivity( T_Activity * table );
extern void FiniActivity( T_Activity * table );
extern void StartActivity( T_Activity * table );
extern a_bool NextActivity( T_Activity * table );
static R_Activity *   ActivityRows[100];
static int            ActivityCount;
static T_Activity *   ActivityList = NULL;
extern void InitActivity( T_Activity * table )
/*********************************************************/
// Initialize a use of the Activity table for use in a query.
// Called when the query is opened.
{
    table->next = ActivityList;
    ActivityList = table;
}
extern void FiniActivity( T_Activity * table )
/*********************************************************/
// Free a use of the Activity table.
// Called when the query is closed.
{
    T_Activity *    chase;
    T_Activity * *  pchase = &ActivityList;
    // Remove this table use from the list
    for( ; ; ) {
        chase = *pchase;
        if( chase == table ) break;
        pchase = &chase->next;
    }
    *pchase = chase->next;
}
extern void StartActivity( T_Activity * table )
/*********************************************************/
// Called from a "START" node in the query plan.
{
    table->current = 0;     // position before the first row
}
extern a_bool NextActivity( T_Activity * table )
/*********************************************************/
// Called from a "NEXT" node in the query plan.
{
    R_Activity *    row;
    if( table->current <= ActivityCount ) {
        table->current += 1;    // move to the next row
    }
    if( table->current <= ActivityCount ) {
        // Copy values from the current row
        row = ActivityRows[ table->current - 1 ];
        table->activity_id = row->activity_id;
        table->priority = row->priority;
        memcpy( table->description, row->description, 80 );
        return( TRUE );
    } else {
        return( FALSE );    // No more rows.
    }
}
```

E. Generated Code for Queries

Each query in an UltraLite application will have source code (e.g., C) generated for executing the query. In the currently-preferred embodiment, C code is employed using a Sybase Adaptive Server Anywhere™ access plan to determine how the query is executed. The following is the simple query from the present example and an Adaptive Server Anywhere™ access plan for the query.

SELECT description FROM Activity AS act WHERE priority=1

Figure 8:
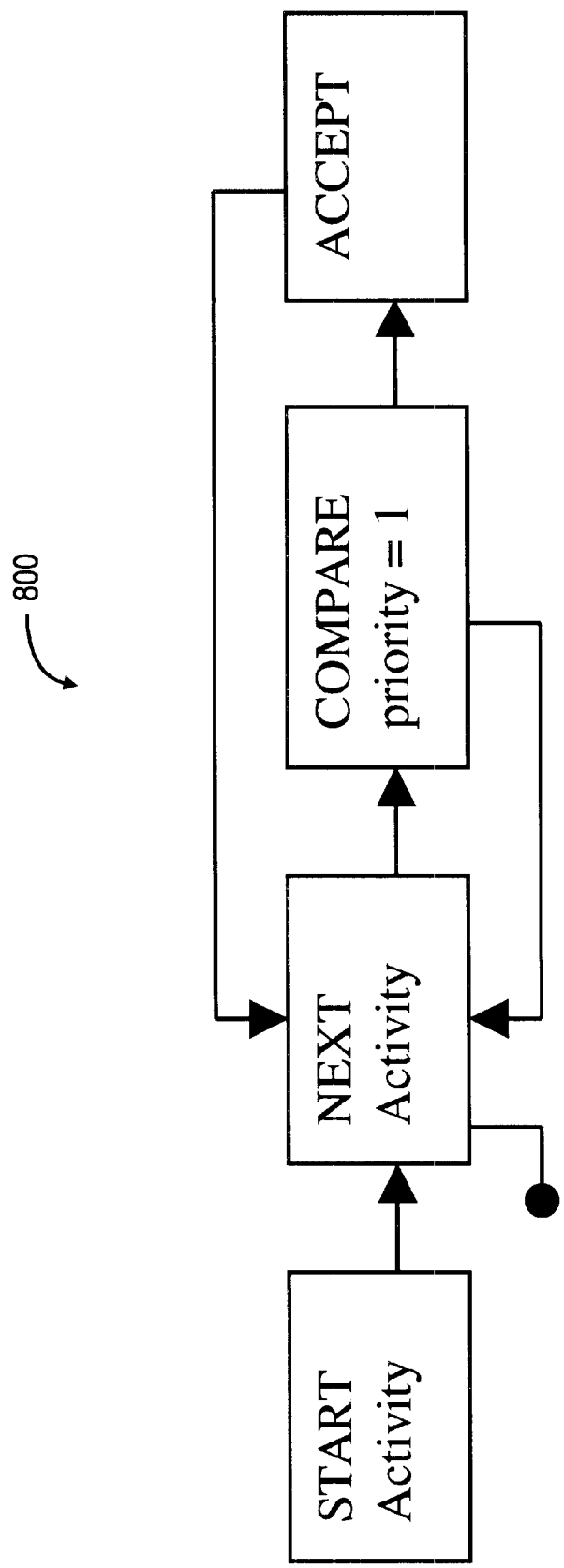
FIG. 8 is a diagram illustrating that access plans can be expressed in a manner corresponding to a state in a finite state machine.

As illustrated in the diagram 800 of FIG. 8, all Adaptive Server Anywhere™ plans can be expressed in a manner corresponding to a state in a finite state machine. Any row that makes it through to ACCEPT belongs in the result set of the query. The main code generated for a query is a loop that corresponds to the Adaptive Server Anywhere™ access plan. All entry points related to a query use an argument that is a pointer to a structure that stores state information about the query. This state information includes state information for tables used in the query.

Exemplary generated code for the query is as follows.

```
// nodes in the access plan
typedef enum S_HighPriority {
        START_HighPriority_act,
        NEXT_HighPriority_act,
        COMPARE_HighPriority_priority,
        ACCEPT_HighPriority
} S_HighPriority;
// the state of the HighPriority query
typedef struct Q_HighPriority {
        T_Activity      act;     // table use for Activity table
        S_HighPriority  state;   // current node in access plan
} Q_HighPriority;
extern void OpenHighPriority( Q_HighPriority * query )
/*********************************************************/
{
        // Initialize table use
        InitActivity( &query->act );
        // Set state to first node in the query plan
        Query->state = START_HighPriority_act;
}
extern void CloseHighPriority( Q_HighPriority * query )
/*********************************************************/
{
        // Free table use
        FiniActivity( &query->act );
```

-continued

```
}
extern a_bool SeekHighPriority
        ( Q_HighPriority *query,
          a_bool      absolute,
          int         offset )
/***************************************************/
// Seek a HighPriority query to a new row
{
    for( ; ; ) {
        switch( query->state ) {
        case START_HighPriority_act:
            // Position to the start of the Activity table.
            StartActivity( &query->act );
            query->state = NEXT_HighPriority_act;
            break;
        case NEXT_HighPriority_act:
            // Move to the next row in the Activity table.
            if( NextActivity( &query->act ) ) {
                // Next node in the plan is the comparison node
                query->state = COMPARE_HighPriority_priority;
            } else {
                // There are no more rows in the table.
                return( FALSE );
            }
            break;
        case COMPARE_HighPriority_priority:
            if( query->act.priority == 1 ) {
                // Comparison succeeded.
                query->state = ACCEPT_HighPriority;
            } else {
                // Comparison failed, get next row.
                query->state = NEXT_HighPriority_act;
            }
            break;
        case ACCEPT_HighPriority:
            // The current row belongs in the result set.
            query->state = NEXT_HighPriority_act;
            return( TRUE );
        }
    }
}
```

F. Generated Code for Embedded SQL

The embedded SQL in an UltraLite application is converted to C code that will call the generated code for tables and queries. The following is the original example with the embedded SQL commented and C code substituted by the pre-processor.

```
*include "sqlca.h"
extern void DisplayHighPriority( void )
/*************************************/
// Display all high priority activities
{
    // EXEC SQL BEGIN DECLARE SECTION
        char            buffer[80];
    // EXEC SQL END DECLARE SECTION
    // EXEC SQL DECLARE HighPriority CURSOR FOR
    //     SELECT description FROM Activity AS act WHERE priority = 1;
    Q_HighPriority    HighPriority;
    // EXEC SQL OPEN HighPriority;
    OpenHighPriority( &HighPriority );
    for( ; ; ) {
        // EXEC SQL FETCH HighPriority INTO buffer;
        if( SeekHighPriority( &HighPriority, FALSE, 1 ) ) {
            memcpy( buffer, HighPriority.act.description, 80 );
        }
        if( SQLCODE == SQLE_NOTFOUND ) break;
        printf( "%s\n", buffer );
    }
    // EXEC SQL CLOSE HighPriority;
    CloseHighPriority( &HighPriority );
}
```

Summary of UltraLite Development Process

Figure 9:
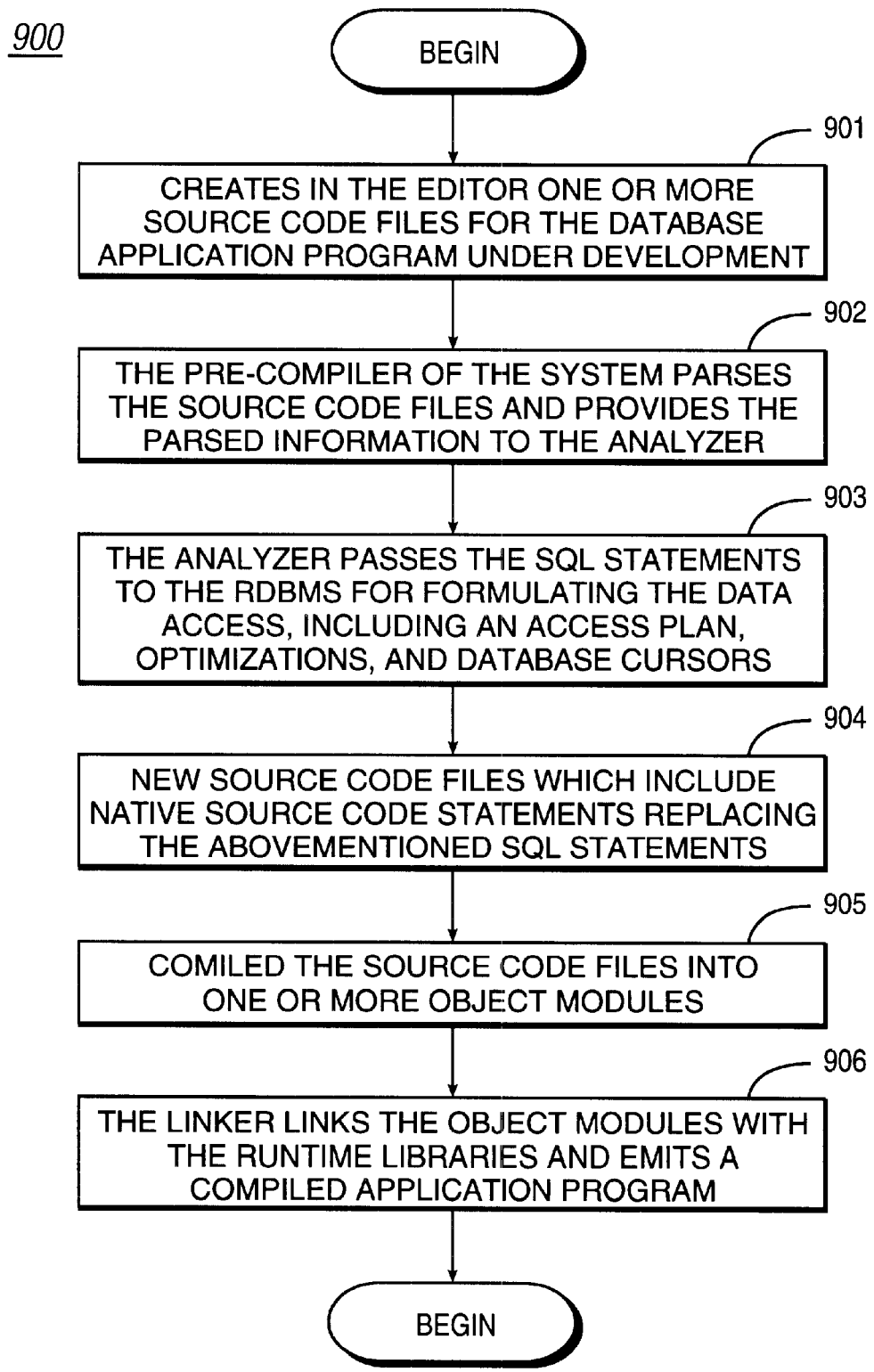
FIG. 9 is a flow chart illustrating the overall process of development of an UltraLite database application.

FIG. 9 illustrates method steps 900 of the overall process of development of an UltraLite database application. At step 901, the user creates in the Editor one or more source code files for the database application program under development; the source code includes SQL statements. At step 902, the Pre-compiler of the system parses the source code files and provides the parsed information to the Analyzer. The Analyzer passes the SQL statements to the RDBMS for formulating the data access, including an access plan, optimizations, and database cursors, as indicated at step 903. Moreover, the Analyzer creates appropriate data structures and methods in the application program for a creating, accessing, and processing a run-time version of the database. Based on the foregoing, the system creates, at step 904, new source code files which include native source code statements replacing the abovementioned SQL statements.

Now, the source code is ready for compilation. Specifically, at step 905, the source code files are compiled by the Compiler into one or more object modules. The Linker links the object modules with the runtime libraries and emits a compiled application program, at step 906. The application program includes both application logic and database logic for accessing a target database embedded within the program.

Attached herewith are Computer Program Listing Appendices A–E (submitted on compact disc) including source listings and scripts providing further description of the present invention, the disclosures of which are hereby incorporated by reference. A suitable C/C++ compiler/linker compiling and linking the source listings is available from a variety of vendors, including Watcom C++ from Sybase, Inc. of Emeryville, Calif., and Microsoft Visual C++ from Microsoft Corporation of Redmond, Wash.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computer system, a method for creating a database application program for accessing and processing data from a database, the method comprising:

receiving source code for the database application program, the source code including embedded SQL statements;

examining the source code for determining information about the embedded SQL statements present in the source code;

passing the information about the embedded SQL statements present in the source code to a database management system for formulating data access;

based on how data access has been formulated, creating new source code which includes new source code statements replacing the embedded SQL statements, said new source code statements including program logic that provides said data access; and from the new source code, generating an executable version of the database application program.

2. The method of claim 1, wherein said source code comprises at least in part source code authored in the C programming language.

3. The method of claim 1, wherein said embedded SQL statements present in the source code comprise static SQL statements.

4. The method of claim 1, wherein said database comprises one or more database tables.

5. The method of claim 4, wherein each database table stores a plurality of data records, each data record storing one or more field values for the data record.

6. The method of claim 1, wherein said step of passing the information about the embedded SQL statements present in the source code to a database management system for formulating data access includes:

determining by the database management system a query plan comprising an optimized access strategy for processing the SQL statements.

7. The method of claim 1, wherein the database is created as an in-memory data structure for the program.

8. The method of claim 1, wherein said embedded SQL statements include a query specifying retrieval of specific information of interest from the database.

9. The method of claim 1, wherein said new source code includes information specifying at least one database cursor for maintaining state information about a particular database table of the database.

10. In a computer system, a method for creating a database application program for accessing and processing data from a database, the method comprising:

receiving source code for the database application program, the source code including embedded SQL statements;

examining the source code for determining information about the embedded SQL statements present in the source code;

passing the information about the embedded SQL statements present in the source code to a database management system for formulating data access;

based on how data access has been formulated, creating new source code which includes new source code statements replacing the embedded SQL statements; and from the new source code, generating an executable version of the database application program;

wherein the executable version of the database application program includes instructions for processing a run-time version of the database which is itself embedded within the program.

11. A database development system comprising:

an editor module for creating source code for an application program under development, the source code including both native source code statements and embedded query language statements;

a pre-compiler for identifying any embedded query language statements present in the source code;

an analyzer for generated new source code that replaces the embedded query language statements in the source code with native source code statements that perform database operations required by the embedded query language statements; and a compiler for compiling the new source code, for creating an executable version of the database application program.

12. The system of claim 11, wherein said query language statements comprise SQL-type statements.

13. The system of claim 11, wherein said pre-compiler parses the source code for determining information about any embedded SQL statements present in the source code.

14. The system of claim 13, wherein said embedded SQL statements comprise static SQL statements.

15. The system of claim 11, wherein said source code comprises at least in part source code authored in the C programming language.

16. The system of claim 11, wherein said database comprises one or more database tables.

17. The system of claim 16, wherein each database table stores a plurality of data records, each data record storing one or more field values for the data record.

18. The system of claim 11, further comprising:

a database management system, in communication with the analyzer, for formulating data access.

19. The system of claim 18, wherein said database management system formulates a query plan for processing the query language statements.

20. The system of claim 11, wherein the application program includes instructions for processing a run-time version of the database which is itself embedded within the program.

21. The system of claim 11, wherein the database is created as an in-memory data structure for the program.

22. The system of claim 11, wherein said embedded query language statements include a query specifying retrieval of specific information of interest from the database.

23. The system of claim 11, wherein said new source code includes information specifying at least one database cursor for maintaining state information about a particular database table of the database.

24. A database development system comprising:

an editor module for creating source code for an application program under development, the source code including both native source code statements and embedded query language statements;

a pre-compiler for identifying any embedded query language statements present in the source code;

an analyzer for generated new source code that replaces the embedded query language statements in the source code with native source code statements that perform database operations required by the embedded query language statements; and a compiler for compiling the new source code, for creating an executable version of the database application program;

wherein said analyzer generates at least one index definition for creating an index at run-time for creating a logical ordering of a database table of the database.

25. A database development system comprising:

an editor module for creating source code for an application program under development, the source code including both native source code statements and embedded query language statements;

a pre-compiler for identifying any embedded query language statements present in the source code;

an analyzer for generated new source code that replaces the embedded query language statements in the source code with native source code statements that perform database operations required by the embedded query language statements; and a compiler for compiling the new source code, for creating an executable version of the database application program;

wherein said analyzer generates at least one transaction data structure for indicating data records that have been modified by a transaction which has occurred in the database.

* * * * *